US010378409B2

(12) United States Patent
Yamauchi et al.

(10) Patent No.: US 10,378,409 B2
(45) Date of Patent: Aug. 13, 2019

(54) EXHAUST GAS PURIFICATION CATALYST

(71) Applicant: TOYOTA JIDOSHA KABUSHIKI KAISHA, Toyota-shi, Aichi-ken (JP)

(72) Inventors: Jota Yamauchi, Susono (JP); Takahiro Hayashi, Susono (JP); Masaya Ibe, Susono (JP); Satoru Katoh, Nagakute (JP); Tsuyoshi Hamaguchi, Nagakute (JP); Toshiyuki Tanaka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 15/480,988

(22) Filed: Apr. 6, 2017

(65) Prior Publication Data

US 2017/0292427 A1 Oct. 12, 2017

(30) Foreign Application Priority Data

Apr. 7, 2016 (JP) ................................ 2016-077677

(51) Int. Cl.
*F01N 3/20* (2006.01)
*B01J 23/63* (2006.01)
(Continued)

(52) U.S. Cl.
CPC ......... *F01N 3/208* (2013.01); *B01D 53/9422* (2013.01); *B01J 23/63* (2013.01);
(Continued)

(58) Field of Classification Search
CPC ................ B01D 53/94; B01D 53/9422; B01D 53/9495; B01D 53/96; B01D 2255/1021;
(Continued)

(56) References Cited

U.S. PATENT DOCUMENTS

2005/0014638 A1* 1/2005 Miura .................. B01D 53/945 502/304
2013/0058839 A1* 3/2013 Miyairi ................. F01N 3/0222 422/177

FOREIGN PATENT DOCUMENTS

EP 1498181 A1 1/2005
EP 2979755 A1 2/2016
(Continued)

OTHER PUBLICATIONS

Machine Translation JP 2000-110554 done Oct. 11, 2018.*

*Primary Examiner* — Audrey K Bradley
*Assistant Examiner* — Dapinder Singh
(74) *Attorney, Agent, or Firm* — Oliff PLC

(57) ABSTRACT

An object of the present disclosure is to provide an exhaust gas purification catalyst demonstrating superior storage of NOx contained in exhaust gas.

The exhaust gas purification catalyst of the present disclosure has a substrate, a first catalyst layer containing a catalytic metal for NOx reduction and a NOx storage material and formed on the substrate, and a second catalyst layer containing a catalytic metal for NOx oxidation and formed on the first catalyst layer. In the exhaust gas purification catalyst of the present disclosure, the value obtained by dividing the volume of all large pores having a pore volume of 1000 $\mu m^3$ or more by the total volume of all medium pores of having a pore volume of 10 $\mu m^3$ to 1000 $\mu m^3$ in the second catalyst layer is 2.44 or less.

8 Claims, 5 Drawing Sheets

(51) Int. Cl.

*B01D 53/94* (2006.01)
*F01N 3/10* (2006.01)
*B01J 37/00* (2006.01)
*B01J 37/02* (2006.01)
*F01N 3/28* (2006.01)

(52) U.S. Cl.

CPC ....... *B01J 37/0018* (2013.01); *B01J 37/0248* (2013.01); *F01N 3/106* (2013.01); *B01D 2255/1021* (2013.01); *B01D 2255/1023* (2013.01); *B01D 2255/1025* (2013.01); *B01D 2255/2022* (2013.01); *B01D 2255/2025* (2013.01); *B01D 2255/2042* (2013.01); *B01D 2255/2065* (2013.01); *B01D 2255/40* (2013.01); *B01D 2255/9022* (2013.01); *B01D 2255/91* (2013.01); *B01D 2255/9205* (2013.01); *B01D 2258/012* (2013.01); *F01N 3/2828* (2013.01); *F01N 2240/16* (2013.01); *F01N 2240/40* (2013.01); *F01N 2610/02* (2013.01); *F01N 2610/1453* (2013.01); *Y02T 10/24* (2013.01)

(58) Field of Classification Search

CPC .... B01D 2255/1023; B01D 2255/1025; B01D 2255/2022; B01D 2255/2025; B01D 2255/2042; B01D 2255/2065; B01D 2255/40; B01D 2255/9022; B01D 2255/91; B01D 2255/9205; B01D 225/012; B01D 2258/012; B01J 23/63; B01J 37/0018; B01J 37/0218; B01J 37/08; F01N 3/106; F01N 3/208; F01N 3/282; F01N 3/035; F01N 3/103; F01N 3/2013; F01N 3/0218; F01N 3/101; F01N 3/2006; F01N 3/2033; F01N 3/2066; F01N 3/0814; F01N 3/2026; F01N 3/0842; F01N 3/085; F01N 3/0871; F01N 3/0885; F01N 2240/16; F01N 2240/40; F01N 2610/02; F01N 2610/14534; F01N 11/00; F01N 13/009; F01N 13/0097; F01N 2430/06; F01N 2900/08; F01N 2900/1402; F01N 2900/1612; F01N 2900/1614; F01N 2900/1622; F01N 2900/0412; F02D 41/027; F02D 45/00

USPC .................. 60/274, 275, 277, 295, 299–301; 422/104, 169, 171

See application file for complete search history.

(56) References Cited

FOREIGN PATENT DOCUMENTS

| | | | |
|---|---|---|---|
| JP | 2000-110554 | * | 4/2000 |
| JP | 2010-234309 A | | 10/2010 |
| JP | 2012-240027 A | | 12/2012 |

* cited by examiner

EXHAUST GAS PURIFICATION CATALYST

TECHNICAL FIELD

The present disclosure relates to an exhaust gas purification catalyst.

BACKGROUND ART

Exhaust gas discharged from automobile internal combustion engines such as gasoline engines or diesel engines contains components such as carbon monoxide (CO), hydrocarbons (HC) and nitrogen oxides (NOx).

Consequently, internal combustion engines are typically provided with an exhaust gas purification device for decomposing and removing these components, and these components are substantially decomposed by an exhaust gas purification catalyst installed in this exhaust gas purification device. An example of such an exhaust gas purification catalyst is a NOx storage-reduction catalyst.

In a lean atmosphere, this NOx storage-reduction catalyst converts nitrogen oxides present in exhaust gas to $NO_2$ and stores $NO_2$, and reduces stored $NO_2$ to nitrogen ($N_2$) in stoichiometric and rich atmospheres, thereby altering the atmosphere of exhaust gas between lean, stoichiometric, and rich and making it possible to purify exhaust gas, for example, exhaust gas containing NOx, with high efficiency.

In general, it is preferable that NOx storage-reduction catalysts have high NOx storage performance. This is because, the amount of stored $NO_2$ and the storage rate thereof in a lean atmosphere increase as NOx storage capacity becomes higher, and as a result thereof, both the amount of purified exhaust gas containing NOx in particular and the purification rate thereof increase. Thus, studies are being conducted on NOx storage-reduction catalysts demonstrating improved $NO_2$ storage performance in particular.

The exhaust gas purification catalyst of Patent Document 1 has a substrate, a first catalyst layer containing rhodium and formed on the substrate, and a second catalyst layer containing platinum and formed on the first catalyst layer, and the second catalyst layer contains a support on which is loaded a first metal oxide containing a first metal element selected from the group consisting of alkaline metals and alkaline earth metals, and a second metal oxide containing a second metal element selected from the group consisting of rare earth metals. In this exhaust gas purification catalyst of Patent Document 1, it is described that the first and second metal oxides contained in the second catalyst layer have the ability to release sulfur, and that decreases in catalytic activity of precious metals are inhibited as a result thereof.

The exhaust gas purification catalyst of Patent Document 2 is provided with a catalyst layer, a plurality of voids having an elongated shape are present in this catalyst layer, and the mode of the frequency distribution relating to the aspect ratio of a cross-section of these voids is 2 or more. In this exhaust gas purification catalyst of Patent Document 2, it is described to the effect that the plurality of voids having an elongated shape present in the catalyst layer are interconnected, and that this results in an increase in the number of gas diffusion paths.

PRIOR ART DOCUMENTS

Patent Documents

[Patent Document 1] Japanese Unexamined Patent Publication No. 2010-234309

[Patent Document 2] Japanese Unexamined Patent Publication No. 2012-240027

DISCLOSURE OF THE DISCLOSURE

Problems to be Solved by the Disclosure

An object of the present disclosure is to provide an exhaust gas purification catalyst demonstrating superior storage of NOx contained in exhaust gas.

Features for Solving the Problems

The inventors of the present disclosure found that the aforementioned object can be achieved by the features indicated below.

(1) An exhaust gas purification catalyst having a substrate, a first catalyst layer containing a catalytic metal for NOx reduction and an NOx storage material and formed on the substrate, and a second catalyst layer containing a catalytic metal for NOx oxidation and formed on the first catalyst layer;

wherein the volume percentage of all pores in the second catalyst layer is 2.82% by volume to 8.30% by volume, and wherein the value obtained by dividing the total volume of all large pores having a pore volume of 1000 $\mu m^3$ or more by the total volume of all medium pores of having a pore volume of 10 $\mu m^3$ to 1000 $\mu m^3$ is 2.44 or less in the second catalyst layer.

(2) The exhaust gas purification catalyst described in (1), wherein the catalytic metal for NOx reduction contains Rh.

(3) The exhaust gas purification catalyst described in (1) or (2), wherein the catalytic metal for NOx oxidation contains Pt and/or Pd.

(4) The exhaust gas purification catalyst described in any one of (1) to (3), which is a catalyst for purifying NOx.

(5) A method for purifying exhaust gas, comprising: contacting exhaust gas containing NO with the exhaust gas purification catalyst described in any one of (1) to (4), to oxidize NO to $NO_2$ and store the $NO_2$ in a lean atmosphere, and purifying the stored $NO_2$ by reducing the stored $NO_2$ in a stoichiometric atmosphere or rich atmosphere.

Effects of the Disclosure

According to the present disclosure, an exhaust gas purification catalyst can be provided that demonstrates superior storage of NOx contained in exhaust gas.

BRIEF DESCRIPTION OF THE DRAWINGS

FIG. 1A shows a conceptual drawing of an exhaust gas purification catalyst of the prior art, while

FIG. 2A is a schematic diagram of a medium pore, while

DETAILED DESCRIPTION OF THE DISCLOSURE

Figure 1A:
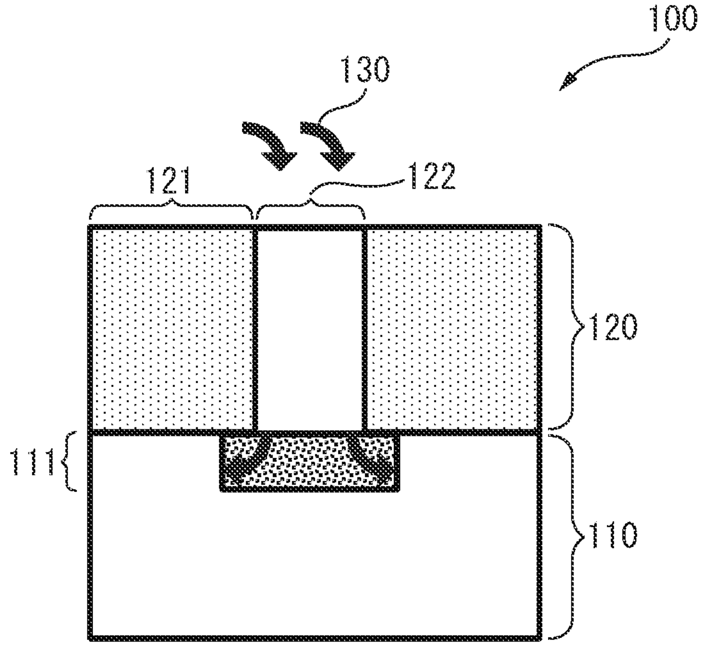

The following provides a detailed explanation of embodiments of the present disclosure. Furthermore, the present disclosure is not limited to the following embodiments, but rather can be worked by altering in various ways within the scope of the gist of the present disclosure. Moreover, in the explanation of the drawings, the same reference numerals are used to indicate the same elements and duplicate explanations thereof are omitted.

In addition, in the present disclosure, "large pores" refer to pores having a volume of 1000 $\mu m^3$ or more, "medium pores" refer to pores having a volume of 10 $\mu m^3$ to 1000 $\mu m^3$, and "small pores" refer to pores having a volume of 10 $\mu m^3$ or less.

<<Exhaust Gas Purification Catalyst of Prior Art>>

The exhaust gas purification catalyst of the prior art has a substrate, a first catalyst layer containing a catalytic metal for NOx reduction and an NOx storage material and formed on the substrate, and a second catalyst layer containing a catalytic metal for NOx oxidation and formed on the first catalyst layer.

In the exhaust gas purification catalyst of the prior art, the catalytic metal for NOx oxidation contained in the second catalyst layer catalyzes a reaction that oxidizes NO to convert it to $NO_2$, thereby enabling the exhaust gas purification catalyst to store $NO_2$ in a lean atmosphere; and the catalytic metal for NOx reduction contained in the first catalyst layer catalyzes a reaction that reduces the stored $NO_2$ to convert it to $N_2$ in a stoichiometric and rich atmosphere, thereby resulting in purification of NOx.

The inventors of the present disclosure found that NOx present in exhaust gas is not adequately stored in the exhaust gas purification catalyst of the prior art. Without intending to be bound by any particular theory, this is believed to be due to the exhaust gas being non-uniformly supplied to the first catalyst layer through a comparatively large number of large pores present in the second catalyst layer, thereby preventing the NOx oxidation reaction from being adequately catalyzed, and/or preventing NOx from being adequately stored in the first catalyst layer. Thus, the inventors of the present disclosure arrived at the exhaust gas purification catalyst of the present disclosure as described below in order to improve NOx storage capacity.

<<Exhaust Gas Purification Catalyst of Present Disclosure>>

The exhaust gas purification catalyst of the present disclosure has a substrate, a first catalyst layer containing a catalytic metal for NOx reduction and a NOx storage material and formed on the substrate, and a second catalyst layer containing a catalytic metal for NOx oxidation and formed on the first catalyst layer.

In addition, in the exhaust gas purification catalyst of the present disclosure, the volume percentage of all pores of the second catalyst layer is 2.82% by volume or more, 3.00% by volume or more, 3.50% by volume or more or 3.52% by volume or more. As a result, exhaust gas is able to adequately enter the second catalyst layer. Moreover, in the exhaust gas purification catalyst of the present disclosure, the volume percentage of all pores of the second catalyst layer is 8.30% by volume or less, 8.00% by volume or less, 7.50% by volume or less, 7.00% by volume or less, 6.00% by volume or less, 5.00% by volume or less or 4.67% by volume or less. As a result, exhaust gas is adequately treated in the second catalyst layer.

Moreover, the shape of the pores in the second catalyst layer of the exhaust gas purification catalyst of the present disclosure may be elongated. As a result, it is possible for the percentage of continuous pores to be higher than the percentage of independent pores in the second catalyst layer of this exhaust gas purification catalyst, thereby making it possible for exhaust gas to be adequately diffused in the second catalyst layer. In addition, since the shape of the pores is elongated, namely in the shape of ovals, surface area is larger in comparison with pores having a spherical shape. Thus, a larger amount of exhaust gas can be treated.

Pore shape may be expressed in numerical form by using the aspect ratio of a cross-section of the pores. In addition, the mode of the frequency distribution of aspect ratio is preferably 2 or more. Namely, those pores having an aspect ratio of 2 or more are preferably present in the largest amount in the second catalyst layer. As a result, it is possible to increase the percentage of continuous pores. In addition, the mode is more preferably 2 to 100, even more preferably 2 to 20 and particularly preferably 2 to 5.

In addition, the value obtained by dividing the total volume of all large pores having a pore volume of 1000 $\mu m^3$ or more by the total volume of all medium pores having a pore volume of 10 $\mu m^3$ to 1000 $\mu m^3$ in the second catalyst layer of the exhaust gas purification catalyst of the present disclosure is 2.44 or less, 2.40 or less or 2.00 or less. Namely, since the percentage of medium pores increases, exhaust gas that has entered the large pores is able to further enter the medium pores.

Moreover, the value obtained by dividing the total volume of all large pores having a pore volume of 1000 $\mu m^3$ by the total volume of all medium pores having a pore volume of 10 $\mu m^3$ to 1000 $\mu m^3$ in the second catalyst layer of the exhaust gas purification catalyst of the present disclosure is 0.50 or more or 1.00 or more. Namely, since the percentage of large pores increases, a larger amount of exhaust gas easily enters the second catalyst layer.

As a result of the value obtained by dividing the total volume of all large pores having a pore volume of 1000 $\mu m^3$ or more by the total volume of all medium pores having a pore volume of 10 $\mu m^3$ to 1000 $\mu m^3$ in the second catalyst layer of the exhaust gas purification catalyst of the present disclosure being a value specified by the aforementioned ranges, exhaust gas is uniformly supplied into the first catalyst layer through a comparatively small number of large pores and a comparatively large number of medium pores present in the second catalyst layer, thereby making it possible to improve the efficiency of NOx oxidation and/or the efficiency of NOx storage. Namely, NOx contained in exhaust gas that has passed through the second catalyst layer can be adequately oxidized and then stored in the NOx storage material after being uniformly supplied to the first catalyst layer.

Furthermore, in the present disclosure, the "volume percentage of all pores of the second catalyst layer" refers to the value obtained by dividing the total volume of all pores present in the second catalyst layer per unit volume by that unit volume. More specifically, the "volume percentage of all pores of the second catalyst layer" refers to the value obtained by treating a plurality of images captured by X-ray computed tomography (X-ray CT) with a three-dimensional image analyzer to prepare a three-dimensional image, and then dividing the total volume of all pores present in that three-dimensional image by the total volume of the three-dimensional image. In addition, in the present disclosure, the "total volume of all large pores having a pore volume of 1000 $\mu m^3$ or more" refers to a value obtained by calculating the total volume of all large pores having a pore volume of 1000 $\mu m^3$ or more in the aforementioned three-dimensional image. Moreover, the "total volume of all medium pores having a pore volume of 10 $\mu m^3$ to 1000 $\mu m^3$" refers to a value obtained by calculating the total volume of all medium pores having a pore volume of 10 $\mu m^3$ to 1000 $\mu m^3$ in the aforementioned three-dimensional image.

FIG. 1A shows a conceptual drawing of an exhaust gas purification catalyst of the prior art. An exhaust gas purification catalyst 100 of the prior art has a first catalyst layer 110 and a second catalyst layer 120 formed on the first catalyst layer 110. In addition, the first catalyst layer 110 has a first catalyst portion 111, and the second catalyst layer 120 has a second catalyst portion 121 and a comparatively large number of large pores 122. Exhaust gas 130 enters the large pores 122 and then non-uniformly reaches the first catalyst layer 110, after which it reaches the catalyst portion 111 of the first catalyst layer 110. In this exhaust gas purification catalyst 100, only a portion of the catalyst portion of the first catalyst layer 110 is utilized, thereby preventing NOx present in the exhaust gas from being adequately stored.

Figure 1B:
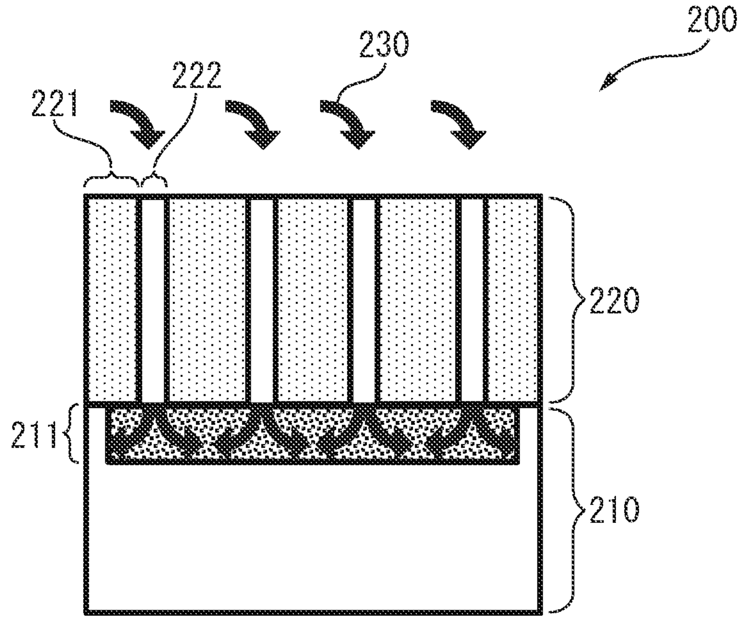
FIG. 1B shows a conceptual drawing of one embodiment of the exhaust gas purification catalyst of the present disclosure.

FIG. 1B shows a conceptual drawing of one embodiment of the exhaust gas purification catalyst of the present disclosure. An exhaust gas purification catalyst 200 has a first catalyst layer 210 containing a NOx storage material and a second catalyst layer 220 formed on the first catalyst layer 210. In addition, the first catalyst layer 210 has a first catalyst portion 211, and the second catalyst layer 220 has a catalyst portion 221 and a comparatively large number of medium pores 222. Exhaust gas 230 enters the medium pores 222 and the NOx contained therein is oxidized. The exhaust gas 230 then reaches the first catalyst layer 210 comparatively uniformly and then reaches the catalyst portion 211 of the first catalyst layer 210. In this exhaust gas purification catalyst 200, since the entire catalyst portion of the first catalyst layer 210 containing an NOx storage material is utilized, NOx oxidation efficiency and/or NOx storage efficiency are improved.

The following provides a detailed explanation of constituents of the exhaust gas purification catalyst of the present disclosure.

<Substrate>

The substrate has a gas flow path through which exhaust gas passes. The structure of this gas flow path may have, for example, a honeycomb structure, foam structure, or plate structure. There are no particular limitations on the material of the substrate, and examples thereof may include those made of ceramics, such as cordierite or SiC, and those made of metal.

<First Catalyst Layer>

The first catalyst layer contains a catalytic metal for NOx reduction and a NOx storage material, and further optionally contains other catalytic metals, supporting powder, and co-catalyst.

Although there are no particular limitations thereon, the thickness of the first catalyst layer is preferably within the range of 15 μm to 130 μm and more preferably within the range of 70 μm to 120 μm. If the thickness of the first catalyst layer is within the aforementioned ranges, exhaust gas can be adequately contacted with the first catalyst layer.

(Catalytic Metal for NOx Reduction)

There are no particular limitations on the catalytic metal for NOx reduction provided it is a metal that is capable of catalyzing a NOx reduction reaction in a rich environment. Examples of catalytic metals for NOx reduction may include platinum group elements such as Rh from the viewpoint of the ability to catalyze a NOx reduction reaction.

Although there are no particular limitations thereon, the contained concentration of the catalytic metal for NOx reduction in the first catalyst layer is preferably within the range of 0.05 g/L to 10 g/L and more preferably within the range of 0.1 g/L to 5 g/L. Furthermore, the unit "g/L" refers to the mass (g) of the catalytic metal for NOx reduction per 1 L of substrate.

(NOx Storage Material)

There are no particular limitations on the NOx storage material provided it does not inhibit catalytic activity of the catalytic metal for NOx reduction. Examples of NOx storage materials can include alkaline metals and salts thereof such as lithium (Li) and lithium acetate, potassium (K) and potassium acetate, alkaline earth metals and salts thereof such as barium (Ba) and barium acetate, and combinations thereof.

(Other Catalytic Metals)

There are no particular limitations on other catalytic metals provided they do not inhibit catalytic activity of the catalytic metal for NOx reduction.

(Supporting Powder)

There are no particular limitations on the supporting powder provided it does not inhibit the catalytic activity of the catalytic metal for NOx reduction. The supporting powder may support the catalytic metal for NOx reduction and other optional catalytic metals. Examples of supporting powders can include silica ($SiO_2$), zirconia ($ZrO_2$), ceria ($CeO_2$), alumina ($Al_2O_3$), titania ($TiO_2$), solid solutions thereof and combinations thereof. The supporting powder may also be a complex oxide of alumina, zirconia and titania.

Although there are no particular limitations thereon, the supported amount of catalytic metal and/or other catalytic metal supported by the supporting powder may be, for example, typically 0.01 parts by weight or more, 0.05 parts by weight or more, 0.1 parts by weight or more, 0.5 parts by weight or more, or 1 part by weight or more, and/or 5 parts by weight or less, 3 parts by weight or less, or 1 part by weight or less based on 100 parts by weight of the supporting powder.

(Co-Catalyst)

There are no particular limitations on the co-catalyst provided it does not inhibit the catalytic activity of the catalytic metal for NOx reduction. A co-catalyst is used for the purpose of further improving catalytic activity, such as by improving the catalytic activity of the catalytic metal. Although there are no particular limitations thereon, an example of a co-catalyst may be ceria.

<Second Catalyst Layer>

The second catalyst layer contains a catalytic metal for NOx oxidation and further optionally contains other catalytic metals, supporting powder, NOx storage material and co-catalyst.

Although there are no particular limitations thereon, the thickness of the second catalyst layer is preferably within the range of 50 μm to 120 μm and more preferably within the range of 15 μm to 65 μm. If the thickness of the second catalyst layer is within the aforementioned ranges, exhaust gas can be adequately contacted with the second catalyst layer.

(Catalytic Metal for NOx Oxidation)

There are no particular limitations on the catalytic metal for NOx oxidation provided it is capable of catalyzing a NOx oxidation reaction. Examples of catalytic metals for NOx oxidation may include platinum group elements such as Pt and/or Pd from the viewpoint of the ability to catalyze a NOx oxidation reaction in a lean environment.

Although there are no particular limitations thereon, the contained concentration of the catalytic metal for NOx oxidation in the second catalyst layer is preferably within the range of 0.05 g/L to 10 g/L and more preferably within the range of 0.1 g/L to 5 g/L. Furthermore, the unit "g/L" refers to the mass (g) of the catalytic metal for NOx oxidation per 1 L of substrate.

The aforementioned description of the first catalyst layer can be referred to with respect to the other catalytic metals, supporting powder, NOx storage material, and co-catalyst.

<<Method for Purifying Exhaust Gas of Present Disclosure>>

The method for purifying exhaust gas of the present disclosure comprises:

contacting exhaust gas containing NO with the aforementioned exhaust gas purification catalyst of the present disclosure, storing $NO_2$ after oxidizing the NO to it in a lean atmosphere, and purifying by reducing the stored $NO_2$ in a stoichiometric atmosphere or rich atmosphere.

The method of the present disclosure is preferably applied to an internal combustion engine operating in a lean environment. This is because, in a lean environment, HC and CO are easily oxidized and purified while NOx is resistant to reduction and purification, thereby resulting in the generation of a large amount of NOx.

Any arbitrary method can be used for the method used to contact exhaust gas containing NOx with the exhaust gas purification catalyst of the present disclosure in a lean atmosphere.

<<Method for Producing Exhaust Gas Purification Catalyst>>

The method for producing an exhaust gas purification catalyst comprises the following steps:

forming a first catalyst layer slurry layer by applying a first catalyst layer slurry to a substrate and then forming a first catalyst layer by drying and/or calcining the first catalyst layer slurry layer, and further forming a second catalyst layer slurry layer by applying a second catalyst layer slurry to the first catalyst layer formed on the surface of the substrate and then forming a second catalyst layer by drying and/or calcining the second catalyst layer slurry layer.

<Step for Forming First Catalyst Layer>

(Preparation and Applying of First Catalyst Layer Slurry)

The step for forming the first catalyst layer may include a procedure for preparing the first catalyst layer slurry.

The first catalyst layer slurry may contain a solvent and a binder in addition to the aforementioned materials contained in the first catalyst layer of the exhaust gas purification catalyst of the present disclosure.

Furthermore, examples of raw materials of the catalytic metal such as raw materials of the catalytic metal for NOx reduction can include salts and halides of the catalytic metal and combinations thereof. Examples of raw materials of the catalytic metal can include inorganic salts of the catalytic metal such as nitrates, phosphates, and sulfates; organic salts of the catalytic metal such as oxalates, and acetates; halides of the catalytic metal such as fluorides, chlorides, bromides, and iodides; and combinations thereof.

There are no particular limitations on the solvent, and examples thereof include water and ion exchange water. In addition, there are no particular limitations on the binder, and an example thereof is alumina binder.

There are no particular limitations on the coating method of the first catalyst layer slurry, and an example thereof is wash coating.

<Drying and/or Calcining of First Catalyst Layer Slurry Layer>

Although there are no particular limitations thereon, the temperature, time, and atmosphere used when drying the first catalyst layer slurry layer, may be, for example, a temperature within the range of 80° C. to 120° C., a time within the range of 1 hours to 10 hours and an air atmosphere, respectively. Although there are no particular limitations thereon, the temperature, time, and atmosphere used when calcining the first catalyst layer slurry layer may be, for example, a temperature within the range of 400° C. to 1000° C., a time within the range of 2 hours to 4 hours, and an air atmosphere, respectively.

<Step for Forming Second Catalyst Layer>

(Preparation and Applying of Second Catalyst Layer Slurry and Drying and/or Calcining of that Layer)

The step for forming the second catalyst layer may include a procedure for preparing the second catalyst layer slurry.

The second catalyst layer slurry may contain a pore forming material, a solvent and a binder in addition to the aforementioned materials contained in the second catalyst layer of the exhaust gas purification catalyst of the present disclosure.

The pore forming material is used to form pores having a target size in the second catalyst layer. Although there are no particular limitations thereon, the pore forming material preferably has an elongated shape. This is because the shape of the pores in the second catalyst layer is formed by burning off the pore forming material.

In the case the size of the pore forming material is comparatively larger than the target size of the medium pores in the present disclosure (10 $\mu m^3$ to 1000 $\mu m^3$), in comparison with, for example, the condition of using an equal amount of a pore forming material having a medium pore size, the percentage of the total volume of medium pores having a pore volume of 10 $\mu m^3$ to 1000 $\mu m^3$ relative to the total volume of all large pores in second catalyst layer of the resulting exhaust gas purification catalyst tends to increase. In other words, the value obtained by dividing the total volume of all large pores having a pore volume of 1000 $\mu m^3$ or more by the total volume of all medium pores having a pore volume of 10 $\mu m^3$ to 1000 $\mu m^3$ tends to decrease.

Figure 2A:
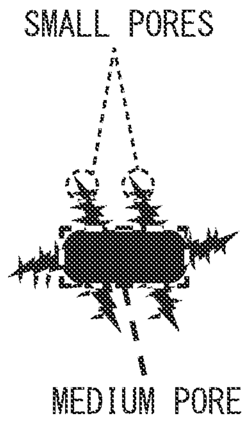
Figure 2B:
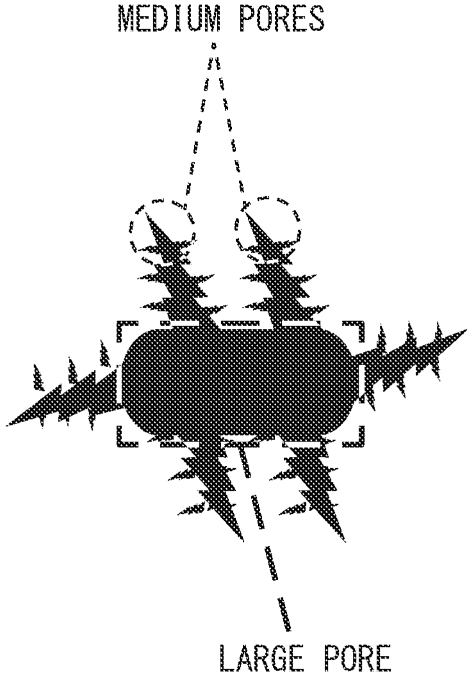
FIG. 2B is a schematic diagram of a large pore.
Figure 3A:
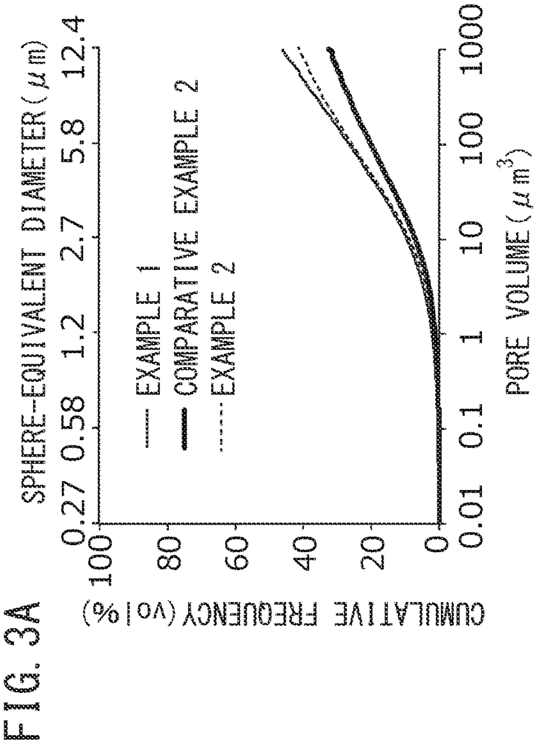
FIGS. 3A to 3D show the relationship between pore volume ($\mu m^3$) and cumulative frequency (vol %) with respect to the second catalyst layer of the exhaust gas purification catalysts of Examples 1 and 2 and Comparative Example 2; Examples 3 and 4 and Comparative Example 3; Examples 5 to 7; and Comparative Example 1, respectively.
Figure 3B:
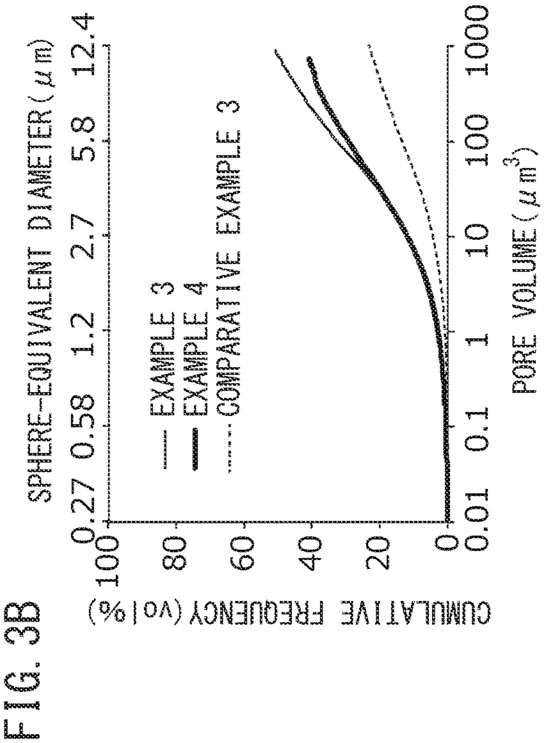
Figure 3C:
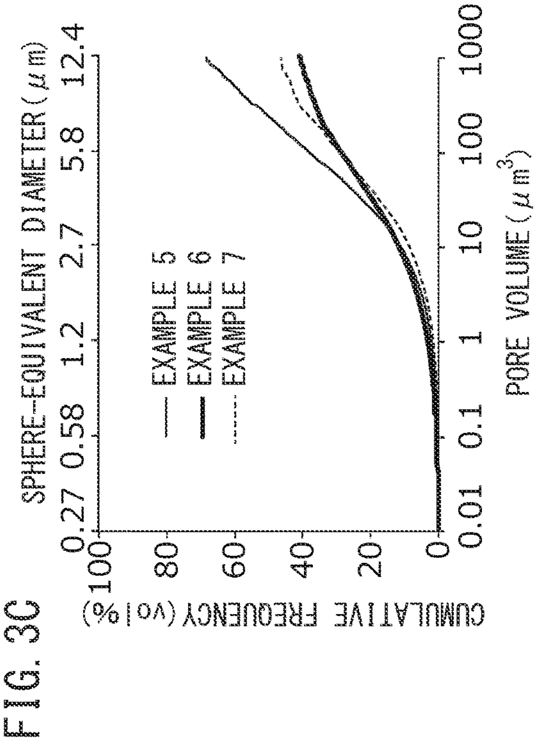
Figure 3D:
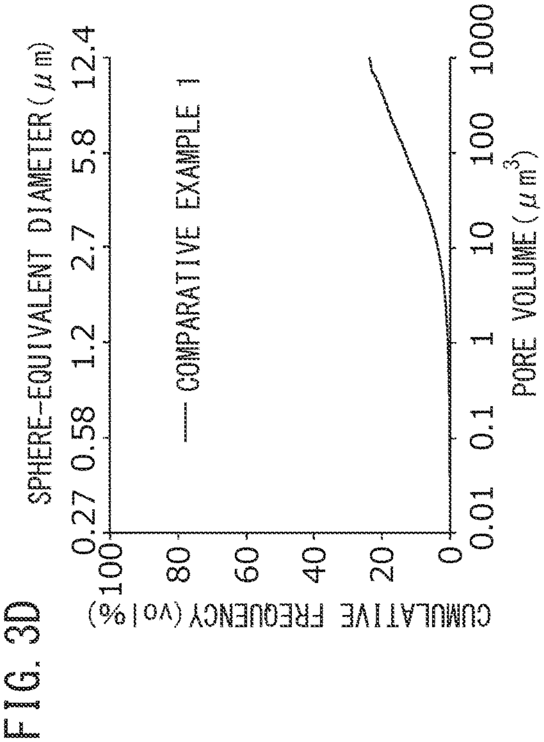

Without intending to be bound by any particular theory, an explanation is provided of the size of the pore forming material having an effect on the formation of target medium pores with reference to FIGS. 2A and 2B. FIG. 2A is a schematic diagram of a medium pore, while FIG. 2B is a schematic diagram of a large pore.

FIG. 2A indicates that, in the case the size of the pore forming material is roughly equal to the size of the target medium pores of the present disclosure, the percentage of small pores that are smaller than the target medium pores tends to increase. Namely, since cracks around the medium pores are smaller than the medium pores, the percentage of small pores smaller than the target medium pores tends to increase in comparison with the medium pores.

FIG. 2B indicates that, in the case the size of the pore forming material is comparatively larger than the size of the target medium pores of the present disclosure, the percentage of medium pores smaller than the large pores tends to increase. Namely, since cracks around the large pores are smaller than the large pores, the percentage of the target medium pores tends to increase in comparison with the large pores.

Although there are no particular limitations thereon, the size of the pore forming material in terms of the mode of the minor axis thereof is preferably within the range of 10 μm to 50 μm, and the mode of the major axis thereof is preferably within the range of 20 μm to 70 μm. In addition, although there are no particular limitations thereon, the size of the pore forming material in terms of the volume thereof is preferably within the range of 10 μm$^3$ to 2000 μm$^3$ and more preferably within the range of 220 μm$^3$ to 1400 μm$^3$. Furthermore, the size of the pore forming material may be determined in consideration of expansion or contraction of the pore forming material due to the effects of solvent, etc., present in the second catalyst layer slurry.

There are no particular limitations on the pore forming material and examples thereof can include carbon-containing materials such as carbon or cellulose, polycarbonates, glucose and combinations thereof. These carbon-containing materials can be burned off at a comparatively low temperature of, for example, 200° C. to 400° C.

Descriptions of the preparation and applying of the aforementioned first catalyst layer slurry along with drying and/or calcining of a layer thereof can be referred to with respect to preparation and applying of the second catalyst layer slurry along with the drying and/or calcining of that layer.

Furthermore, in the case of drying and/or calcining the second catalyst layer slurry, a time, temperature and atmosphere are preferably used that take into consideration combustion of the pore forming material. However, in the case the temperature of exhaust gas discharged from an installed internal combustion engine is high enough for burning off the pore forming material, the pore forming material may be allowed to remain in the exhaust gas purification catalyst at the stage the exhaust gas purification catalyst is installed in the internal combustion engine.

Furthermore, descriptions of the aforementioned exhaust gas purification catalyst of the present disclosure, the aforementioned method for purifying exhaust gas of the present disclosure, and the aforementioned method for producing an exhaust gas purification catalyst of the present disclosure can be referred to in mutual association therewith.

Although the following provides a more detailed explanation of the present disclosure with reference to the following examples, it goes without saying that the present disclosure is not limited by these examples.

EXAMPLES

<<Note>

The following indicates the method used to produce exhaust gas purification catalysts. It should be understood that the amounts of materials used in this production method, such as the amount of a material such as "Pt nitrate", is an amount that makes it possible to attain the amount of "Pt" or other material indicated in the table showing the compositions of exhaust gas purification catalysts (refer to the following table).

In addition, in the following table, the unit "g/L" refers to the mass (g) of material supported per 1 L of volume of the substrate.

In addition, "upstream end" refers to the entrance where exhaust gas passing through the substrate enters the honeycomb substrate, while "downstream end" refers to the exit where the exhaust gas leaves the substrate.

Example 1

<Step for Forming First Catalyst Layer>

(Preparation and Applying of First Catalyst Layer Slurry)

A supporting powder in the form of a complex oxide powder consisting of $Al_2O_3$, $ZrO_2$ and $TiO_2$ (to also be referred to as AZT complex oxide) was immersed in a mixed solvent of Pt nitrate and Pd nitrate followed by supporting the catalytic metals in the form of Pt and Pd on the AZT complex oxide powder to prepare Catalyst Powder 1.

In addition, a supporting powder in the form of alumina powder was immersed in a Pd nitrate solution followed by supporting the catalytic metal in the form of Pd on the alumina powder to prepare Catalyst Powder 2.

Moreover, a supporting powder in the form of AZT complex oxide powder was immersed in a Rh nitrate solution followed by supporting the catalytic metal in the form of Rh on the AZT complex oxide powder to prepare Catalyst Powder 3.

These Catalyst Powders 1 to 3: NOx storage materials in the form of barium acetate, potassium acetate and lithium acetate; a co-catalyst in the form of ceria; and a binder in the form of alumina binder were mixed followed by mixing this mixture with water to prepare a first catalyst layer slurry.

This first catalyst layer slurry was wash-coated onto a substrate in the form of a cordierite honeycomb substrate (13R13, diameter: 129 mm, L: 100 mm) moving from the upstream end to the downstream end thereof followed by wash-coating again moving from the downstream end to the upstream end of this substrate.

(Drying and/or Calcining of First Catalyst Layer Slurry Layer)

Subsequently, this substrate was then dried for 1 hour at 90° C. followed by calcining for 2 hours at 500° C. to prepare a first catalyst layer.

<Step for Forming Second Catalyst Layer>

(Preparation and Coating of Second Catalyst Layer Slurry and Drying and/or Calcining of that Layer)

A supporting powder in the form of a complex oxide powder consisting of $Al_2O_3$, $ZrO_2$ and $TiO_2$ (to also be referred to as AZT complex oxide) was immersed in a mixed solvent of Pt nitrate and Pd nitrate followed by supporting the catalytic metals in the form of Pt and Pd on the AZT complex oxide powder to prepare a catalyst powder.

This catalyst powder; NOx storage materials in the form of barium acetate, potassium acetate and lithium acetate; a co-catalyst in the form of ceria; and a binder in the form of alumina binder were mixed followed by mixing this mixture with water and a pore-forming material in the form of a carbon compound (Tepyrus®, Teijin Ltd.) to prepare a second catalyst layer slurry.

This second catalyst layer slurry was wash-coated onto the substrate having the first catalyst layer formed thereon moving from the upstream end to the downstream end thereof followed by wash-coating again moving from the downstream end to the upstream end of this substrate.

(Drying and/or Calcining of Second Catalyst Layer Slurry Layer)

Subsequently, this substrate was then dried for 1 hour at 90° C. followed by calcining for 2 hours at 500° C. to obtain an exhaust gas purification catalyst.

Examples 2 to 7 and Comparative Examples 1 to 3

The exhaust gas purification catalysts of Examples 2 to 7 and Comparative Examples 1 to 3 were obtained in the same manner as Example 1 with the exception of changing the amount of the pore forming material in the "Step for Forming Second Catalyst Layer" of Example 1.

The composition of the exhaust gas purification catalyst of Example 1 is shown in the following Table 1, while details of the pore forming material (carbon compound) used to produce the exhaust gas purification catalysts of Examples 1 to 7 and Comparative Examples 1 to 3 are shown in the following Table 2.

TABLE 1

| | | | | |
|---|---|---|---|---|
| Example 1 | Second Catalyst Layer | Catalyst Powder | Pt (g/L) | 1.00 |
| | | | Pd (g/L) | 0.20 |
| | | | AZT complex oxide (g/L) | 56.00 |
| | | Storage Material | Ba (g/L) | 13.82 |
| | | | K (g/L) | 3.19 |
| | | | Li (g/L) | 1.79 |

TABLE 1-continued

| | | | |
|---|---|---|---|
| | Co-catalyst | Ceria (g/L) | 6.00 |
| | Binder | Alumina binder (g/L) | 5.00 |
| | Pore Forming Material | Carbon compound | Shown separately |
| First Catalyst Layer | Catalyst Powder 1 | Pt (g/l) | 0.33 |
| | | Pd (g/L) | 0.07 |
| | | AZT complex oxide (g/L) | 120.00 |
| | Catalyst Powder 2 | Pd (g/L) | 0.17 |
| | | Alumina (g/L) | 6.00 |
| | Catalyst Powder 3 | Rh (g/L) | 0.26 |
| | | AZT complex oxide (g/L) | 26.00 |
| | Storage Material | Ba (g/L) | 37.25 |
| | | K (g/L) | 8.59 |
| | | Li (g/L) | 4.81 |

TABLE 1-continued

| | | | |
|---|---|---|---|
| | Co-catalyst | Ceria (g/L) | 14.00 |
| | Binder | Alumina binder (g/L) | 5.00 |
| Base Material | Cordierite honeycomb substrate (13R13, diameter: 129 mm, L: 100 mm) | | |

The "carbon compound" shown in Table 1 features that a carbon compound (Tepyrus®, Teijin Ltd.) was used when preparing the exhaust gas purification catalyst. Thus, this carbon compound is burned off in the prepared exhaust gas purification catalyst by drying treatment and calcining treatment.

TABLE 2

| | | Comp. Ex. 1 | Ex. 1 | Comp. Ex. 2 | Ex. 2 | Ex. 3 | Ex. 4 | Comp. Ex. 3 | Ex. 5 | Ex. 6 | Ex. 7 |
|---|---|---|---|---|---|---|---|---|---|---|---|
| Pore Forming Material | Amt. Added (wt %) | 0 | 1 | 3 | 5 | 1 | 3 | 5 | 1 | 3 | 5 |
| | Minor axis mode (μm) | — | | 13 | | | 10 | | | 37 | |
| | Major axis mode (μm) | — | | 28 | | | 48 | | | 63 | |
| | Volume ($\mu m^3$) | — | | 10 | | | 220 | | | 1400 | |

The "amt. added (wt %)" shown in Table 2 is the value calculated based on g/L of the second catalyst layer slurry. Furthermore, g/L of the second catalyst layer slurry was 65.03 g/L.

<<Evaluation>>

The exhaust gas purification catalysts of each of the aforementioned examples were evaluated by X-ray computed tomography (X-ray CT) and 90% NOx storage.

<Evaluation by X-Ray CT>

Evaluation by X-ray CT was carried out by cutting out two cells of the exhaust gas purification catalysts of each example and applying the following system and conditions to these cells. More specifically, three-dimensional images were generated using the following system followed by calculation of data relating to pore volume from the three-dimensional images. The results are shown in Table 3 and FIGS. 3A to 3D and FIGS. 4 to 5.

(Evaluation System)

Microfocus X-ray tube (L8321, Hamamatsu Photonics K.K.)

X-ray detector: Image intensifier with CCD camera (Hamamatsu Photonics K.K.)

CT reconstruction software: Tomoshop (Midorino Research Corp.)

Three-dimensional image analyzer: TR1/3D VOL (Ratoc System Engineering Co., Ltd.)

(Evaluation Conditions)

Tube voltage: 60 kV

Tube current: 100 μA to 170 μA

Geometric magnification factor: 100×

No. of images captured: 778 images/location

Pixel dimensions: 0.63 μm×0.63 μm×0.63 μm

Imaging field: Φ0.65 mm

TABLE 3

| | | Comp. Ex. 1 | Ex. 1 | Comp. Ex. 2 | Ex. 2 | Ex. 3 | Ex. 4 | Comp. Ex. 3 | Ex. 5 | Ex. 6 | Ex. 7 |
|---|---|---|---|---|---|---|---|---|---|---|---|
| Pore Forming Material | Amt. Added (wt %) | 0 | 1 | 3 | 5 | 1 | 3 | 5 | 1 | 3 | 5 |
| | Minor Axis Mode (μm) | — | | 13 | | | 10 | | | 37 | |
| | Major Axis Mode (μm) | — | | 28 | | | 48 | | | 63 | |
| | Volume ($\mu m^3$) | — | | 10 | | | 220 | | | 1400 | |
| Volume percentage of all pores (vol %) | | 5.82 | 8.30 | 3.70 | 3.52 | 3.77 | 3.58 | 2.98 | 3.50 | 2.82 | 4.67 |

TABLE 3-continued

| | Comp. Ex. 1 | Ex. 1 | Comp. Ex. 2 | Ex. 2 | Ex. 3 | Ex. 4 | Comp. Ex. 3 | Ex. 5 | Ex. 6 | Ex. 7 |
|---|---|---|---|---|---|---|---|---|---|---|
| Total volume of all 0-1 $\mu m^3$ small pores/Total volume of all pores (vol %) | 0.65 | 0.84 | 1.25 | 1.62 | 1.85 | 2.95 | 0.95 | 1.86 | 3.34 | 1.10 |
| Total volume of all 1-10 $\mu m^3$ small pores/Total volume of all pores (vol %) | 3.36 | 3.68 | 5.91 | 7.48 | 6.88 | 9.11 | 3.58 | 8.46 | 8.55 | 5.12 |
| Total volume of all 10-1000 $\mu m^3$ medium pores/Total volume of all pores (vol %) | 24.67 | 27.77 | 25.46 | 32.14 | 31.02 | 29.87 | 18.68 | 40.15 | 29.03 | 28.31 |
| Total volume of all 1000 $\mu m^3$ or larger pores/Total volume of all pores (vol %) | 71.33 | 67.70 | 67.38 | 58.75 | 60.25 | 58.06 | 76.78 | 49.54 | 59.07 | 65.48 |

In Table 3, reference is first made to Examples 1, 3 and 5 in which the added amounts are equal at 1% by weight. Namely, it can be understood from Table 3 that the percentage of all medium pores having a pore volume of 10 $\mu m^3$ to 1000 $\mu m^3$ increases in the order of Example 1 (27.77), Example 3 (31.02) and Example 5 (40.15). In addition, the same can be said with respect to Comparative Example 2, and Examples 4 and 6 having the same added amount of 3% by weight. The reason for this is believed to be that, in the case the size of the pore forming material is comparatively large, such as roughly the size of medium pores, the percentage of medium pores in the second catalyst layer tends to increase in comparison with the percentage of large pores.

Furthermore, the percentage of all medium pores having a pore diameter of 10 $\mu m^3$ to 1000 $\mu m^3$ can be understood to decrease in the order of Example 3, Example 4 and Comparative Example 3, in which the size of the pore forming material is the same. This is believed to be due to an increase in the added amount of pore forming material. More specifically, the resulting state facilitates the aggregation of a plurality of pore forming materials, and this is believed to be factor in the formation of large pores.

FIGS. 3A to 3D respectively indicate the relationship between pore volume ($\mu m^3$) and cumulative frequency (vol %) with respect to the second catalyst layer of the exhaust gas purification catalysts of Examples 1 and 2 and Comparative Example 2; Examples 3 and 4 and Comparative Example 3; Examples 5 to 7, and Comparative Example 1.

Figure 4:
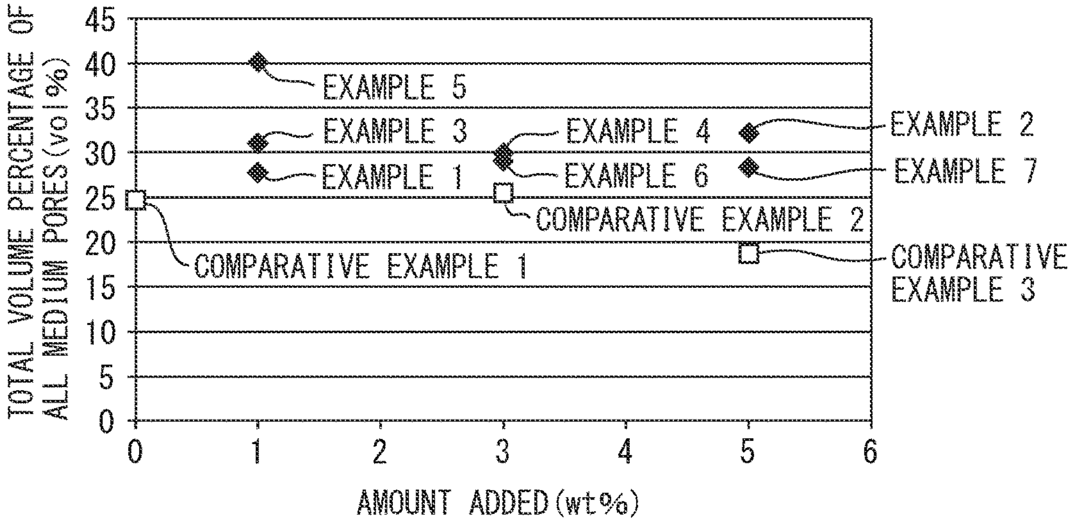
FIG. 4 shows the relationship between amount added (wt %) and the percentage of the total volume of all medium pores having a pore volume of 10 $\mu m^3$ to 1000 $\mu m^3$ (also referred to as the total volume percentage (vol %) of all medium pores) with respect to the second catalyst layer of the exhaust gas purification catalysts of Examples 1 to 7 and Comparative Examples 1 to 3.

FIG. 4 indicates the relationship between the amount added (wt %) and the percentage of the total volume of all medium pores having a pore volume of 10 $\mu m^3$ to 1000 $\mu m^3$ (also referred to as the total volume percentage (vol %) of all medium pores) with respect to the second catalyst layer of the exhaust gas purification catalysts of Examples 1 to 7 and Comparative Examples 1 to 3.

Figure 5:
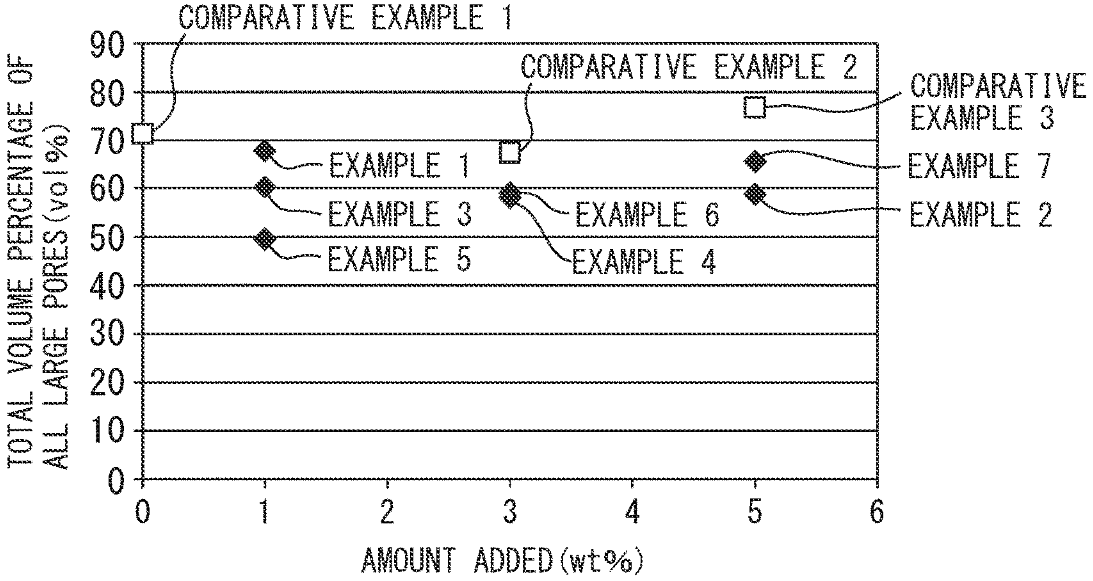
FIG. 5 shows the relationship between amount added (wt %) and the percentage of the total volume of all large pores having a pore volume of 1000 $\mu m^3$ or more (also referred to as the total volume percentage (vol %) of all large pores) with respect to the second catalyst layer of the exhaust gas purification catalysts of Examples 1 to 7 and Comparative Examples 1 to 3.

FIG. 5 indicates the relationship between the amount added (wt %) and the percentage of the total volume of all large pores having a pore volume of 1000 $\mu m^3$ or more (also referred to as the total volume percentage (vol %) of all large pores) with respect to the second catalyst layer of the exhaust gas purification catalysts of Examples 1 to 7 and Comparative Examples 1 to 3.

It can be understood from FIG. 4 that the percentages of medium pores are higher in Examples 1 to 7 in comparison with Comparative Examples 1 to 3. In addition, it can be understood from FIG. 5 that the percentages of large pores are lower in Examples 2 to 7 in comparison with Comparative Examples 1 to 3. Furthermore, there is substantially no difference between the percentages of large pores of Comparative Example 2 and Example 1.

<Evaluation of 90% NOx Storage>

The exhaust gas purification catalyst of each example (all pore sizes) were installed in an engine exhaust system, catalyst temperature was set to 350° C., and exhaust gas from the engine was allowed to flow through the exhaust gas purification catalyst to evaluate 90% NOx storage.

The exhaust gas was composed of rich or lean exhaust gas. The rich exhaust gas was initially allowed to flow through the system for 5 minutes to minimize the amount of NOx stored by the exhaust gas purification catalysts followed by allowing lean exhaust gas to flow through the system until 10% of the NO concentration of the input lean exhaust gas (110 ppm) reaches the NO concentration of the output lean exhaust gas (11 ppm). 90% NOx storage is the amount of NOx stored in the exhaust gas purification catalysts after going through this procedure.

Furthermore, as NOx is supported on the exhaust gas purification catalysts over time and the rate at which this NOx is stored decreases, the NO concentration in the output lean exhaust gas increases over time eventually reaching 11 ppm.

Furthermore, the units of 90% NOx storage are mg of stored NOx per 1 L of volume of the exhaust gas purification catalyst, or in other words, are represented as "mg/L". The compositions of the exhaust gas are shown in the following Table 4. In addition, the results of the evaluations are shown in Table 5 and FIGS. 6 and 7.

TABLE 4

| | Exhaust Gas | |
|---|---|---|
| | Lean | Rich |
| Ga (g/s) | 22 | 14 |
| T (° C.) | 380 | 410 |
| CO (%) | 0 | 2.5 |
| THC (ppmC) | 300 | 1800 |
| NO (ppm) | 110 | 40 |
| $NO_2$ (ppm) | 0 | 0 |
| $H_2$ (%) | 0 | 0 |
| $O_2$ (%) | 9 | 1.5 |
| $CO_2$ (%) | 9 | 13 |
| $H_2O$ (%) | 8 | 11 |
| $N_2$ (%) | Balance | Balance |

Figure 6:
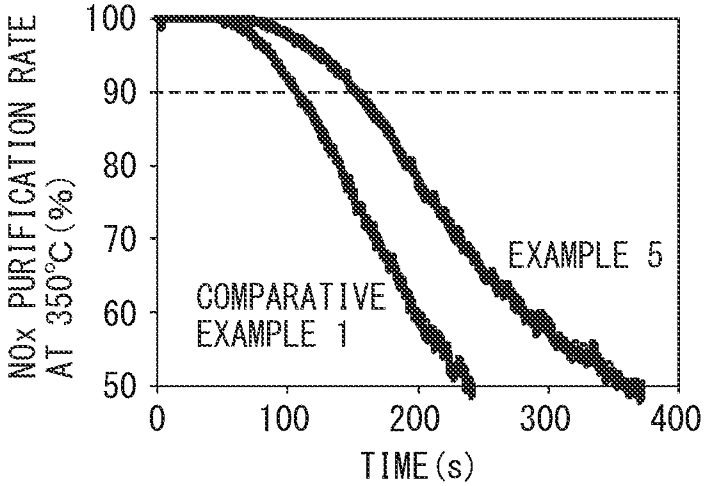
FIG. 6 shows the relationship between the amount of time (Time(s)) elapsed after switching an exhaust gas atmosphere from a rich atmosphere to a lean atmosphere and NOx purification rate (%) at 350° C. with respect to the exhaust gas purification catalysts of Example 5 and Comparative Example 1.

FIG. 6 indicates the relationship between the amount of time (Time(s)) elapsed after switching an exhaust gas atmosphere from a rich atmosphere to a lean atmosphere and NOx purification rate (%) at 350° C. with respect to the exhaust gas purification catalysts of Example 5 and Comparative Example 1.

It can be understood from FIG. 6 that the time (Time) until the NOx storage rate reaches 90% is longer in Example 5 than in Comparative Example 1. Namely, the amount of NOx stored by the exhaust gas purification catalyst can be understood to be greater in Example 5 than in Comparative Example 1.

TABLE 5

| | | Comp. Ex. 1 | Ex. 1 | Comp. Ex. 2 | Ex. 2 | Ex. 3 | Ex. 4 | Comp. Ex. 3 | Ex. 5 | Ex. 6 | Ex. 7 |
|---|---|---|---|---|---|---|---|---|---|---|---|
| Pore Forming Material | Amt. Added (wt %) | 0 | 1 | 3 | 5 | 1 | 3 | 5 | 1 | 3 | 5 |
| | Minor Axis Mode (μm) | — | | 13 | | | 10 | | | 37 | |
| | Major Axis Mode (μm) | — | | 28 | | | 48 | | | 63 | |
| | Volume ($\mu m^3$) | — | | 10 | | | 220 | | | 1400 | |
| Volume percentage of all pores (vol %) | | 5.82 | 8.30 | 3.70 | 3.52 | 3.77 | 3.58 | 2.98 | 3.50 | 2.82 | 4.67 |
| Total volume of all 0-1 $\mu m^3$ small pores/Total volume of all pores (vol %) | | 0.65 | 0.84 | 1.25 | 1.62 | 1.85 | 2.95 | 0.95 | 1.86 | 3.34 | 1.10 |
| Total volume of all 1-10 $\mu m^3$ small pores/Total volume of all pores (vol %) | | 3.36 | 3.68 | 5.91 | 7.48 | 6.88 | 9.11 | 3.58 | 8.46 | 8.55 | 5.12 |
| Total volume of all 10-1000 $\mu m^3$ medium pores/Total volume of all pores (vol %) | | 24.67 | 27.77 | 25.46 | 32.14 | 31.02 | 29.87 | 18.68 | 40.15 | 29.03 | 28.31 |
| Total volume of all 1000 $\mu m^3$ or larger pores/Total volume of all pores (vol %) | | 71.33 | 67.70 | 67.38 | 58.75 | 60.25 | 58.06 | 76.78 | 49.54 | 59.07 | 65.48 |
| 90% NO*x* storage (mg/L) | | 38.5 | 45.8 | 38.0 | 43.4 | 57.5 | 46.9 | 36.3 | 59.6 | 55.5 | 53.0 |
| Total volume of all 1000 $\mu m^3$ or larger pores/Total volume of all 10-1000 $\mu m^3$ medium pores | | 2.89 | 2.44 | 2.65 | 1.83 | 1.94 | 1.94 | 4.11 | 1.23 | 2.03 | 2.31 |

It can be understood from Table 5 that, in the case the value obtained by dividing the total volume of all large pores having a pore volume of 1000 $\mu m^3$ or more by the total volume of all medium pores having a pore volume of 10 $\mu m^3$ to 1000 $\mu m^3$ in the second catalyst layer is 2.44 or less, a high level of NOx storage can be achieved.

This is believed to be due to exhaust that has entered large pores having a pore volume of 1000 $\mu m^3$ or more further entering medium pores having a pore volume of 10 $\mu m^3$ to 1000 $\mu m^3$ in the second catalyst layer, and the exhaust gas being uniformly supplied to the first catalyst layer and stored in the NOx storage material.

Figure 7:
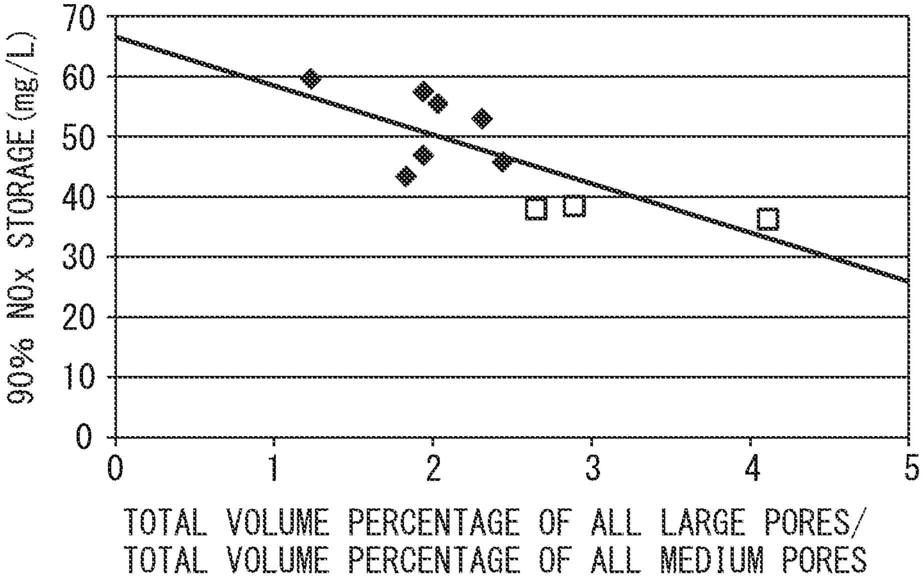
FIG. 7 is a graph indicating the relationship between the value obtained by dividing the total volume of all large pores having a pore volume of 1000 $\mu m^3$ or more by the total volume of all medium pores having a pore volume of 10 $\mu m^3$ to 1000 $\mu m^3$ (total volume percentage of all large pores/total volume percentage of all medium pores) and 90% NOx storage (mg/L) with respect to the exhaust gas purification catalysts of Examples 1 to 7 and Comparative Examples 1 to 3.

FIG. 7 is a graph indicating the relationship between the value obtained by dividing the total volume of all large pores having a pore volume of 1000 $\mu m^3$ or more by the total volume of all medium pores having a pore volume of 10 $\mu m^3$ to 1000 $\mu m^3$ (total volume percentage of all large pores/total volume percentage of all medium pores) and 90% NOx storage (mg/L) with respect to the exhaust gas purification catalysts of Examples 1 to 7 and Comparative Examples 1 to 3.

It can understood from FIG. 7 as well that, in the case the value obtained by dividing the total volume of all large pores having a pore volume of 1000 $\mu m^3$ or more by the total volume of all medium pores having a pore volume of 10 $\mu m^3$ to 1000 $\mu m^3$ in the second catalyst layer is 2.44 or less, a high level of NOx storage can be achieved. It can also be understood from the slanting line in FIG. 7 that a smaller value for (total volume percentage of all large pores/total volume percentage of all medium pores) results in improved 90% NOx storage.

Although the above explanation has provided a detailed description of preferred embodiments of the present disclosure, a person with ordinary skill in the art would understand that the aforementioned embodiments can be modified without deviating from the scope of the claims.

BRIEF DESCRIPTION OF THE REFERENCE NUMERALS

100 Exhaust gas purification catalyst of prior art
110,210 First catalyst layer
111,211 Catalyst portion
120,220 Second catalyst layer
121,221 Catalyst portion
122 Large pores
130,230 Exhaust gas
200 Exhaust gas purification catalyst
222 Medium pores

What is claimed is:

1. An exhaust gas purification catalyst comprising:
a substrate,
a first catalyst layer containing a catalytic metal for NOx reduction and an NOx storage material and formed on the substrate, and
a second catalyst layer containing a catalytic metal for NOx oxidation and formed on the first catalyst layer;
wherein a volume percentage of all pores in the second catalyst layer is 2.82% by volume to 8.30% by volume, the % by volume being obtained by dividing a total volume of all pores in the second catalyst layer per unit volume by the unit volume, and the unit volume being a total volume of a three-dimensional image; and
wherein a value obtained by dividing a total volume of all large pores having a pore volume of 1000 $\mu m^3$ or more by a total volume of all medium pores having a pore volume of more than 10 $\mu m^3$ to less than 1000 $\mu m^3$ is 2.44 or less in the second catalyst layer.

2. The exhaust gas purification catalyst according to claim 1, wherein the catalytic metal for NOx reduction contains Rh.

3. The exhaust gas purification catalyst according to claim 1, wherein the catalytic metal for NOx oxidation contains Pt and/or Pd.

4. The exhaust gas purification catalyst according to claim 2, wherein the catalytic metal for NOx oxidation contains Pt and/or Pd.

5. A method for purifying exhaust gas, comprising:
contacting exhaust gas containing NO with the exhaust gas purification catalyst according to claim 1, to oxidize NO to $NO_2$ and store the $NO_2$ in a lean atmosphere, and
purifying the stored $NO_2$ by reducing the stored $NO_2$ in a stoichiometric atmosphere or rich atmosphere.

6. A method for purifying exhaust gas, comprising:
contacting exhaust gas containing NO with the exhaust gas purification catalyst according to claim 2, to oxidize NO to $NO_2$ and store the $NO_2$ in a lean atmosphere, and
purifying the stored $NO_2$ by reducing the stored $NO_2$ in a stoichiometric atmosphere or rich atmosphere.

7. A method for purifying exhaust gas, comprising:

contacting exhaust gas containing NO with the exhaust gas purification catalyst according to claim 3, to oxidize NO to $NO_2$ and store the $NO_2$ in a lean atmosphere, and purifying the stored $NO_2$ by reducing the stored $NO_2$ in a stoichiometric atmosphere or rich atmosphere.

8. A method for purifying exhaust gas, comprising:

contacting exhaust gas containing NO with the exhaust gas purification catalyst according to claim 4, to oxidize NO to $NO_2$ and store the $NO_2$ in a lean atmosphere, and purifying the stored $NO_2$ by reducing the stored $NO_2$ in a stoichiometric atmosphere or rich atmosphere.

* * * * *